United States Patent
Bill et al.

(10) Patent No.: US 12,162,316 B2
(45) Date of Patent: Dec. 10, 2024

(54) TYRE PRESSURE MONITORING DEVICES ENFORCING RANGE LIMITATION ON COMMUNICATION

(71) Applicants: AIRBUS OPERATIONS LIMITED, Bristol (GB); MEGGITT SA, Villars-sur-Glâne (CH)

(72) Inventors: Andrew Bill, Bristol (GB); Kevin Stanley-Adams, Villars-sur-Glâne (CH); Christophe Blouët, Villars-sur-Glâne (CH)

(73) Assignees: AIRBUS OPERATIONS LIMITED, Bristol (GB); MEGGITT SA, Villars-sur-Glâne (CH)

(*) Notice: Subject to any disclaimer, the term of this patent is extended or adjusted under 35 U.S.C. 154(b) by 3 days.

(21) Appl. No.: 17/547,738

(22) Filed: Dec. 10, 2021

(65) Prior Publication Data
US 2022/0185038 A1 Jun. 16, 2022

(30) Foreign Application Priority Data
Dec. 15, 2020 (GB) ...................... 2019744

(51) Int. Cl.
*B60C 23/04* (2006.01)
*B64D 45/00* (2006.01)

(52) U.S. Cl.
CPC ...... *B60C 23/0437* (2013.01); *B60C 2200/02* (2013.01); *B64D 2045/0085* (2013.01)

(58) Field of Classification Search
CPC ............ B60C 23/0437; B60C 2200/02; B60C 23/0416; B60C 23/045; B60C 23/04; B60C 23/0433; B64D 2045/0085; G01L 17/00; G08C 17/02
USPC ........................................................ 340/442
See application file for complete search history.

(56) References Cited

U.S. PATENT DOCUMENTS

| | | | |
|---|---|---|---|
| 3,835,451 A | 9/1974 | Church | |
| 6,278,363 B1 | 8/2001 | Bezek et al. | |
| 7,944,340 B1 * | 5/2011 | Ghabra | G08C 17/02 307/10.1 |
| 9,552,680 B2 | 1/2017 | Lavoie | |
| 10,821,788 B2 * | 11/2020 | Van Wiemeersch | B60C 23/0418 |
| 11,845,305 B2 | 12/2023 | Regef | |
| 2002/0130771 A1 | 9/2002 | Osborne et al. | |

(Continued)

FOREIGN PATENT DOCUMENTS

| | | |
|---|---|---|
| CA | 2 683 303 A1 | 4/2010 |
| CN | 102126403 A | 7/2011 |

(Continued)

OTHER PUBLICATIONS

European Search Report cited in EP 21213732.7 mailed May 12, 2022, 7 pages.

(Continued)

*Primary Examiner* — Eric Blount
(74) *Attorney, Agent, or Firm* — Nixon & Vanderhye P.C.

(57) ABSTRACT

A tyre monitoring device, tyre monitoring system and method including a wireless interface having range determining capability and a processor. The processor: receives a command via the wireless interface from a second device of the tyre monitoring system; determines a range to the second device; and executes the command if the range to the second device is less than a predetermined threshold.

20 Claims, 6 Drawing Sheets

(56) References Cited

U.S. PATENT DOCUMENTS

| | | |
|---|---|---|
| 2003/0006894 A1 | 1/2003 | Konchin et al. |
| 2004/0164140 A1 | 8/2004 | Voeller et al. |
| 2006/0012475 A1* | 1/2006 | Froitzheim ............ B60C 23/007 340/8.1 |
| 2006/0015286 A1* | 1/2006 | Lu ....................... B60C 23/0433 702/140 |
| 2006/0025897 A1 | 2/2006 | Shostak et al. |
| 2006/0290484 A1 | 12/2006 | Bauchot et al. |
| 2007/0259690 A1* | 11/2007 | Julian ..................... H04W 8/02 455/557 |
| 2009/0058626 A1* | 3/2009 | Watabe ................. B60C 23/045 340/447 |
| 2011/0175715 A1 | 7/2011 | Schondorf et al. |
| 2012/0296513 A1 | 11/2012 | Ramseyer |
| 2013/0145834 A1 | 6/2013 | Mouchet |
| 2015/0002318 A1* | 1/2015 | Cahill .................... B64D 45/00 340/960 |
| 2015/0029016 A1 | 1/2015 | Lesesky et al. |
| 2015/0128691 A1 | 5/2015 | Keller |
| 2015/0224831 A1 | 8/2015 | Miller |
| 2017/0015151 A1 | 1/2017 | Bill |
| 2017/0289732 A1* | 10/2017 | Guinart .............. B60C 23/0416 |
| 2018/0093642 A1* | 4/2018 | Casagrande ............ G06F 21/34 |
| 2018/0178601 A1 | 6/2018 | Surendra |
| 2018/0361803 A1* | 12/2018 | Saburi ................. B60C 23/0442 |
| 2019/0184772 A1 | 6/2019 | Bill et al. |
| 2020/0384815 A1 | 12/2020 | Adler et al. |

FOREIGN PATENT DOCUMENTS

| | | |
|---|---|---|
| CN | 103832227 A | 6/2014 |
| CN | 204674308 U | 9/2015 |
| CN | 106042789 A | 10/2016 |
| CN | 106347040 A | 1/2017 |
| CN | 107635798 A | 1/2018 |
| EP | 1 388 439 | 2/2004 |
| EP | 2 910 393 | 8/2015 |
| EP | 3498501 | 6/2019 |
| FR | 2911712 | 7/2008 |
| GB | 2 429 294 | 2/2007 |
| GB | 2542787 | 4/2017 |
| WO | 2020/254282 | 12/2020 |

OTHER PUBLICATIONS

Chinese Office Action cited in CN 202080007630.5 mailed Jan. 19, 2024, 8 pages.
Chinese Application 2020800007630, Office Action (May 31, 2024)(4 pages).
Non-Final Official Action cited in U.S. Appl. No. 17/418,288 mailed Aug. 1, 2024, 24 pages.

* cited by examiner

TYRE PRESSURE MONITORING DEVICES ENFORCING RANGE LIMITATION ON COMMUNICATION

RELATED APPLICATION

This application claims priority to and incorporates by reference United Kingdom patent application GB2019744.8, filed Dec. 15, 2020.

TECHNICAL FIELD

The present disclosure relates to a tyre monitoring system and methods of its operation. In examples, the present disclosure relates to an aircraft tyre monitoring system, such as an aircraft tyre pressure monitoring system.

BACKGROUND

Checking tyre pressure is an important part of the maintenance of a vehicle. Tyre pressures should be maintained at predetermined pressures to ensure that a tyre performs as intended by the manufacturer. Incorrect tyre pressure can lead to a tyre failing, perhaps bursting and causing damage to the vehicle and/or a loss of control. Due to the high speeds encountered by the tyres on aircraft landing gear, pressures are checked regularly, perhaps once a day or more frequently. Manual checking of tyre pressure takes time, reducing this time is beneficial.

It has been proposed to automate tyre pressure measurement by included a sensing device in a wheel which can then be interrogated wirelessly to provide a measurement of tyre pressure. This can reduce the time required compared to a manual reading but requires security measures, such as encryption keys, because the wireless channel is broadcast outside the aircraft.

SUMMARY

According to a first aspect, there is provided a tyre monitoring device for use in a tyre monitoring system. The tyre monitoring device comprises: a wireless interface having range determining capability; and a processor. The processor is configured to receive a command via the wireless interface from a second device of the tyre monitoring system; determine a range to the second device; and execute the command if the range to the second device is less than a predetermined threshold.

According to a second aspect, there is provided a tyre monitoring device for use in a tyre monitoring system. The tyre monitoring device comprises: a wireless interface having range determining capability; and a processor. The processor is configured to: receive data via the wireless interface from a second device of the tyre monitoring system; determine a range to the second device; and reject the data if the range to the second device is greater than a predetermined threshold. Optionally, the processor is configured to: receive a command via the wireless interface from a third device of the tyre monitoring system; determine a range to the third device; and action the command if the range to the third device is less than a predetermined threshold.

Optionally, the tyre monitoring device is configured to be mounted on an aircraft wheel.

According to a third aspect, there is provided a tyre monitoring system comprising a plurality of tyre monitoring devices as discussed above, with or without optional features.

Optionally, the tyre monitoring system comprises a control device comprising a wireless communication interface having range determining capability.

According to a fourth aspect, there is provided a method for a wireless tyre monitoring device. The method comprises receiving a command via a wireless interface from a second device of the tyre monitoring system; determining a range to the second device; and actioning the command if the range to the second device is less than a predetermined threshold.

According to a fifth aspect, there is provided a method for a wireless tyre monitoring device. The method comprises: receiving data via the wireless interface from a second device of the tyre monitoring system; determining a range to the second device; and rejecting the data if the range to the second device is greater than a predetermined threshold. Optionally, the method further comprises: receive a command via the wireless interface from a third device of the tyre monitoring system; determine a range to the third device; and action the command if the range to the third device is less than a predetermined threshold.

Optionally, in any of the above aspects, the wireless interface comprises an ultra-wideband (UWB) interface.

Optionally, in any of the above aspects, the predetermined threshold is less than or equal to 40 m.

DETAILED DESCRIPTION

Figure 1:
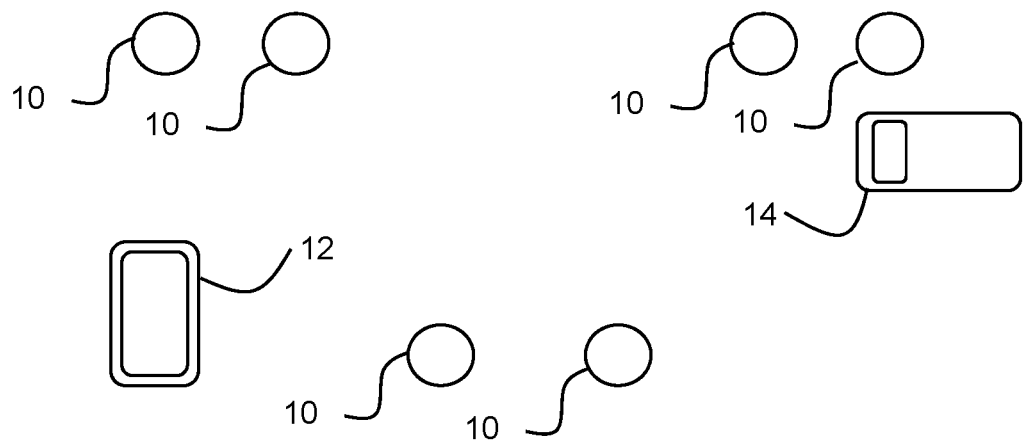
FIG. 1 shows a schematic representation of a tyre monitoring system according to a first example of the invention.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain methods and systems described herein relate to the operation of a sensor network in an aircraft, such as a network of tyre monitoring devices. In examples described herein, references to "aircraft" include all kinds of aircraft, such as fixed wing, for example military or commercial aircraft, or unmanned aerial vehicles (UAVs), and rotary wing aircraft, for example helicopters.

According to examples herein, tyre monitoring devices forming part of a tyre monitoring system provide an indication of the status on the tyre monitoring device itself. For example, an indication of the status may be provided by a light, with the colour of the light giving information of the status. A confirmation of the status indicated on the tyre monitoring devices is provided as an input to a control device where it can be compared to status data received from the tyre monitoring devices themselves. In this way, various human factors may be addressed in the use of the system. When the input is from a user of the system, it means that the user must pay attention to the indication on the devices themselves and not just the information displayed on the control device. This can be important when the indication on the tyre monitoring devices has been certified to a desired Development assurance level (DAL) but the indication on the control device has not. It can also address human error factors such as viewing an incorrect aircraft, when several are in close proximity. As a further advantage, an error may be identified if the user input does not match that displayed on the devices themselves.

In some examples, once the status of the indicator on the tyre monitoring device has been confirmed by the input (in other words the indicator on the tyre monitoring device and the input are both determined to represent the same status) the indicators on the tyre monitoring devices can be switched off. This can lead to power savings, because the indicator does not have to be active for as long. For example, the indicator may be a high intensity LED to allow viewing in bright sunlight. An example of a high intensity LED is the Vishay TLCR5200, a red LED commercially available from Vishay. This LED has a typical luminous intensity of 4000 mcd but dissipates 135 mW, so useful energy savings can be obtained by deactivating it sooner than an overall system timeout. Such energy savings may be particularly useful when the power source of the tyre monitoring device has finite energy reserves, such as a battery, because it will then have a direct impact on the life of the tyre monitoring device.

Example Tyre Monitoring System

FIG. 1 shows a schematic representation of a tyre monitoring system, in this case a pressure sensor system according to a first example. The system comprises a plurality of tyre monitoring devices 10, a control device 12 and a configuration device 14, all of which are arranged to communicate via wireless communication. A tyre monitoring device is mounted on each wheel of a vehicle, in this case an aircraft (as explained in more detail below, with reference to FIG. 5). The control device 12 is separate from the tyre pressure sensors 10 and may be a dedicated control device which functions only in the tyre pressure sensor system, or a computing device which can also be used for other purposes than with the tyre pressure sensor system. Example computing devices include mobile devices such as laptops, tablets, cellular phones and wireless communication devices.

The wireless communications in the tyre pressure sensor system of FIG. 1 may use a local area network or a personal area network and can have any suitable topography, including centralized and mesh wireless systems. In centralized systems, a single device may be nominated as a master device to coordinate communications, or one or more additional wireless access points, gateways or controllers (not shown) may be used. In some examples, the tyre monitoring devices 10, control device 12 and configuration device 14 may all communicate using the same wireless technology and form a single network. In other examples one or more of the tyre monitoring devices 10, control device 12 and configuration device 14 may be separated from other elements of the system. Such separation may be provided in software, for example by providing a suitable firewall and/or the use of different network IDs and encryption keys. Such separation may also be provided by hardware, for example by different wireless communication technology. Both hardware and software separation may be combined. For example, in the system of FIG. 1, the control device communicates with the tyre sensing devices with a different wireless communication technology than the configuration, which may improve the security of the system.

Figure 2:
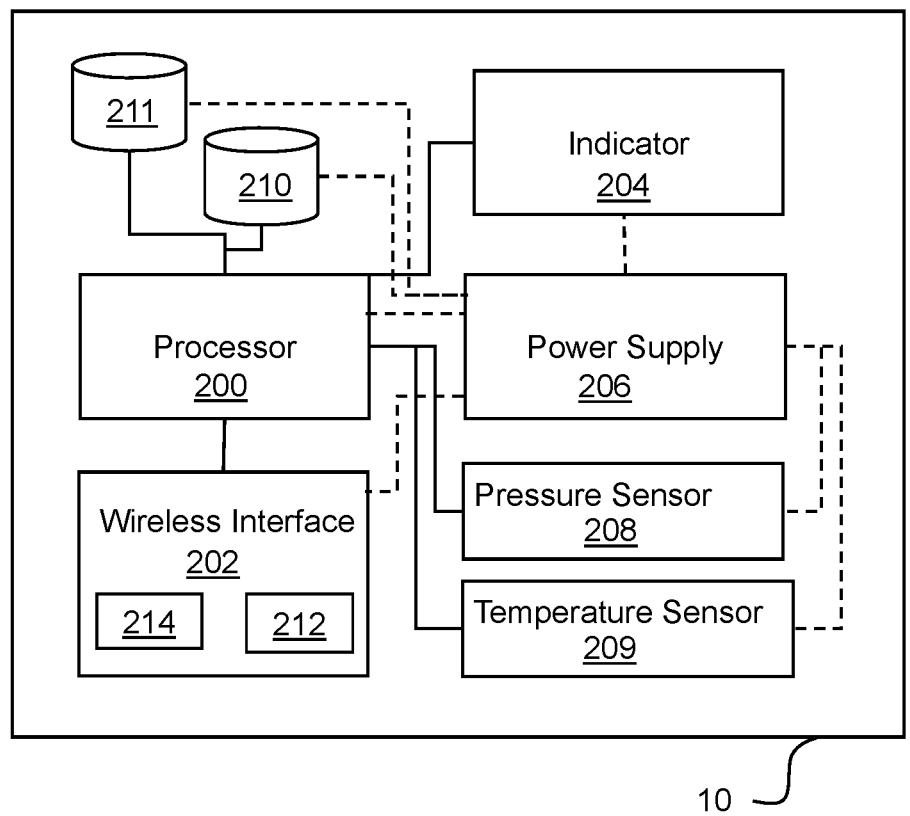
FIG. 2 shows a schematic representation of a tyre monitoring device for use in the example of FIG. 1.

FIG. 2 shows a schematic representation of a tyre monitoring device 10 for use in the tyre pressure sensor system of FIG. 1. The tyre monitoring device 10 is configured for mounting on a wheel, for example by a mechanical connection to an opening on the wheel providing access to the tyre. The tyre monitoring device 10 includes a processor 200, a wireless communication interface 202, an indicator 204, a power supply 206, and a pressure sensor 208, a temperature sensor 209, a first storage 210 and a second storage 211.

Processor 200 may be any suitable processing device including a microprocessor with one or more processing cores. In use, processor 200 coordinates and controls the other components and may be operative to read and/or write computer program instructions and data from/to the storage 210, 211. The processor may be optimized for low power operation or have at least one processing core optimized for low power operation in some examples.

Wireless communication interface 202 is connected to the processor 200 and is used to both transmit and received data from the other devices of the tyre pressure sensor system. In this example, the wireless communication interface includes two transceivers, 212, 214 which both use different wireless technology. A first transceiver 212 is provided for relatively long-range communication, up to about 50 m or about 100 m. For example, the first transceiver may use a communication standard suitable for mobile devices, such as IEEE 802.15.1, IEEE 802.15.4, IEEE 802.11 (Wi-Fi) on either the 2.4 GHz or 5 GHz Industrial Scientific and Medical (ISM) bands or a Wireless Avionics Intra-Communications (WAIC) standard. The first transceiver also includes an encryption module for encrypting sent data and decrypting received data, for example according to the Advanced Encryption Standard (AES) utilizing pre-shared keys. A second transceiver 214 is provided for relatively short-range communications. For example, the second transceiver 214 may use a standard according to IEEE 802.15, such as IEEE 802.15.4, RFID or Near Field Communication (NFC). The second transceiver may operate over a range of less than 5 m, less than 3 m, less than 1 m, less than 50 cm, less than 25 cm, less than 10 cm, less than 5 cm, less than 1 cm or requiring contact between devices. Like the first transceiver 212, the second transceiver 214 also includes an encryption module for encrypting sent data and decrypting received data.

In some examples, a single wireless transceiver may be provided in the wireless communication interface. In that case the single transceiver may use relatively short range or relatively long range communication, or adjust the range (such as by controlling transmit power) as required.

Indicator 204 is connected to the processor 200 and controlled by the processor 200 to provide indications to a user of the tyre pressure sensor system. In this example the indicator is an LED, but in other examples the indicator is another form of light, a display, such as an LCD or e-ink display, or any other form of visual indication. In other examples, the indicator is an audible indicator, such as a buzzer, beeper, speaker or any other sound generating component. In further examples, the indicator can comprise both audible and visual indication components. The indicator provides at least first and second indications, for example a first colour and a second colour of emitted light. Further indications can also be provided, such as solid or flashing light. The tyre monitoring device has a housing (not shown) and the indicator 204 can provide an indication outside the housing, for example the LED may be mounted external to the housing or visible through the housing, or sound may be able to be emitted from within the housing.

The power supply 206 provides power to the elements of the sensing device. It may be a battery, such as Lithium battery. In this example, the power supply is a Lithium battery with power sufficient to run the sensor in normal operation for about 2 to 3 years. In other examples the power supply may comprise a power harvesting system, for example harvesting vibration and/or electromagnetic radiation to charge a capacitor or battery which is then used to power the device.

In use, the wireless sensing device may spend much of its operational life in "sleep" or low power mode, with most of the components other than the processor and wireless communication interface powered off. This can conserve battery life. For example, the tyre monitoring device may be by default in a low power mode, listening for a command to measure or report tyre pressure. As tyre pressure readings are likely to be required relatively rarely, perhaps as little as once every 10 days, once every 5 days, once every 3 days or once per day, this can provide useful power savings. In other examples, pressure may be sensed more frequently for example every 10 minutes, 15 minutes, 20 minutes, 30 minutes, 1 hour or 2 hours and stored for use in trend monitoring.

The pressure sensor 208 is connected to processor 200 and may be any suitable sensor for measuring pressure, for example a capacitive sensor. Similarly, the temperature sensor 209 is connected to processor 200 and may be any suitable sensor for measuring temperature, such as thermocouple. The temperature sensor 209 may be arranged to measure the temperature of the wheel or the temperature of the gas inside the tyre directly. Where the temperature sensor 209 measures the temperature of the wheel, this can be processed to determine the temperature of the gas in the tyre. For example, an algorithm or look-up table may be used.

The connection of the pressure sensor 208 and temperature sensor 209 to the processor 200 may be digital, providing a digital representation of the measured pressure and/or temperature from an Analogue to Digital Convertor (ADC) in the sensor itself, or analogue, in which case the processor may include an ADC to sample the received signal. Including both a pressure sensor and a temperature may be useful to determine a temperature compensated pressure value. Although this example includes a pressure sensor and a temperature sensor, other examples may include only a pressure sensor, or may include further sensors.

This example includes two storage elements 210 and 211. Storage 210 is non-volatile rewritable storage in this example, such as flash memory which can retain data without requiring applied power. Other examples may include volatile storage, which is kept powered by the power supply, or combinations of read-only and rewritable storage. Storage 210 is connected to the processor 200 and used to store both computer program instructions for execution by the processor and data, such as data from the pressure sensor 208 or received over the wireless communication interface 202. In some examples, storage 210 may store a history of pressure and/or temperature readings sensed by the pressure sensor 208 and the temperature sensor 209. For example, the previous ten days readings may be stored, with the newest data replacing the oldest once the storage is full.

Storage 211 is secure storage to which write and/or read access is restricted, for example only accessible to certain processes running on processor 200. Configuration data, such as wireless encryption keys can be stored in storage 211. In other examples, a single storage may be provided, or storage 210 and 211 may be provided in a single physical device with a logical partitioning between storage 210 and storage 211.

Figure 3:
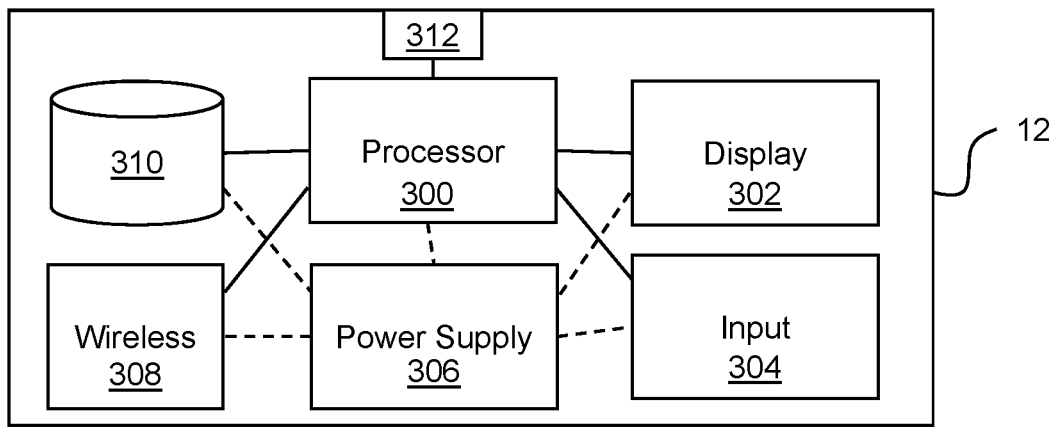
FIG. 3 shows a schematic representation of a control device for use in the example of FIG. 1.

FIG. 3 shows a schematic representation of a control device 12 for use in the example of FIG. 1. The control device 12 includes a processor 300, a display 302, an input system 304, a power supply 306, a wireless interface 308, a storage 310 and wired communication interface 312. In this example the control device is a mobile device, such as a cellular phone or a tablet computer.

The processor 300 is any suitable processing device, for example a multipurpose microprocessor, system-on-chip, or system in package, which may include one or more processing cores. Processor 300 is connected to the display 302, such an LCD, OLED or e-ink display to display information to a user of the control device.

Input system 304 includes a touch screen interface in this example, allowing a user to interact with the control device by touching user interface elements on the screen. The input system 304 may include one or more buttons in addition to the touch screen, as well as other input devices, such as a microphone for speech recognition and a camera for image input. Other examples may not include a touch screen interface.

The control device is powered by power supply 306, which is a rechargeable lithium-ion battery in this example. Other examples may use alternative power supplies, such as other battery technologies, mains power, or energy harvesting, such as solar power.

A wireless interface 308 is included for the control device 12 to communicate with other devices in the tyre pressure sensor system. In this example, a single wireless interface 308 is provided which is configured to communicate with the tyre monitoring devices 10. For example, a relatively long range wireless communication technology can be used, such as one conforming to IEEE 802.15.1, IEEE 802.15.4 or IEEE 802.11. This allows the control device 12 to interact with the tyre monitoring devices from a relatively long range.

In other examples, the control device may be provided with multiple wireless communication interfaces or transceivers, operating with different wireless technologies, such as at least two of IEEE 802.15.1, IEEE 802.15.4, IEEE 802.11 (Wi-Fi_33), WAIC, RFID and NFC. For example, the control device may have two transceivers with one having a longer communication range than the other.

Storage 310 includes a non-volatile element, such as flash memory, and a volatile element, such as RAM. The non-volatile element is used to store operating system software and application software. In this example, the control device runs standard operating system software and is loaded with application software to interact with the tyre pressure sensor system. In order to restrict access to the tyre pressure sensor network, the application software may be provided from a secure source and not available to the general public, and/or require credentials to be entered before operating.

Wired communication interface 312 is provided for connection to a computing system. The wired communication interface 312 can be for example, a serial data connection, such as Universal Serial Bus (USB), a parallel data connection or a network connection, such as Ethernet. The wired communication interface 312 may allow the control device to communicate values and/or other status information read from the tyre monitoring devices to the computing system, for example to store long term trends and assist fleet management. Alternatively, or additionally, wireless communication interface 308 may be used for communication with the computing system. In some examples, the control device may not include a wired communication interface.

Figure 4:
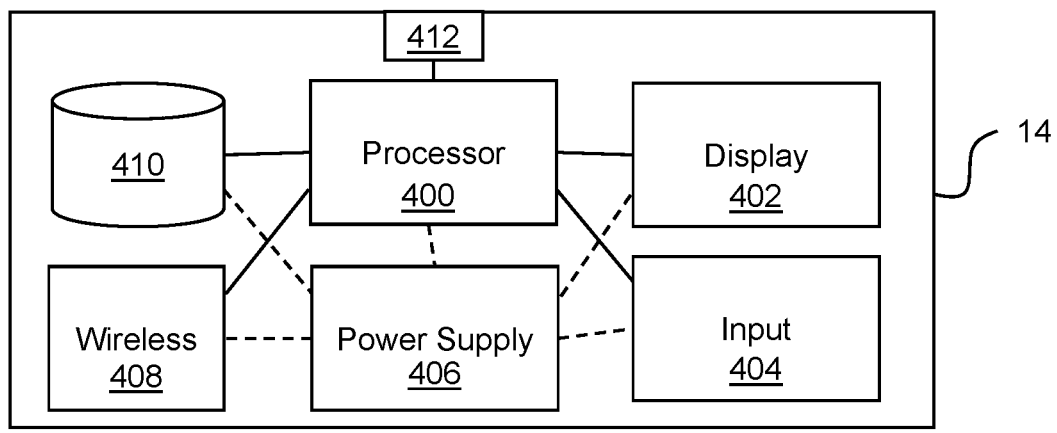
FIG. 4 shows a schematic representation of a configuration device for use in the example of FIG. 1.

FIG. 4 shows a schematic representation of a configuration device 14 for use in the example of FIG. 1. The configuration device 14 includes generally the same elements as the control device 12: a processor 400, display 402, input system 404, power supply 406, wireless interface 408, storage 410 and wired communication interface 412 and these are generally the same as described above for the control device, unless described otherwise below. In this example the configuration device is a mobile device but is restricted to operate only with the tyre monitoring system. For example, the configuration device may be a computing device or tablet which can only run software for interaction with the tyre monitoring system.

The wireless communication interface 408 of the configuration device in this example is a relatively short-range communication system, for example IEEE 802.15.1, IEEE 802.15.4, NFC or RFID. This allows the configuration device to act as an additional authentication factor when configuring the tyre monitoring devices, for example the tyre monitoring device may only respond to configuration commands received from the configuration device or may only respond to configuration commands received from the control device after a command received from the configuration device.

In other examples, the configuration device may include multiple wireless communication interfaces or transceivers. For example, the configuration device may include a transceiver for relatively short range communications as discussed above and a transceiver for relatively long-range communications, such as one conforming to IEEE 802.11.

The wired communication interface 412 of the configuration device may be used to provide information to the configuration device in a secure manner, for example enabling some encryption keys to be updated over a wired interface, such as a serial data connection, rather than a wireless interface.

In some examples, the configuration device 14 may be omitted and its place taken by the control device 12. The control device 12 may comprise a short range wireless communication interface, such as one conforming to IEEE, 802.15.1, IEEE 802.15.4, RFID or NFC. Application software may be loaded onto the control device to allow the control device to also function as an additional authentication factor, perhaps through the maintenance of cryptographic keys which can only be accessed with suitable credentials to control the operation of the short range wireless communication interface for the transmission of configuration commands. In these examples, separate application software may be provided on the control device which can be executed to cause the control device to function as a configuration device.

Figure 5:
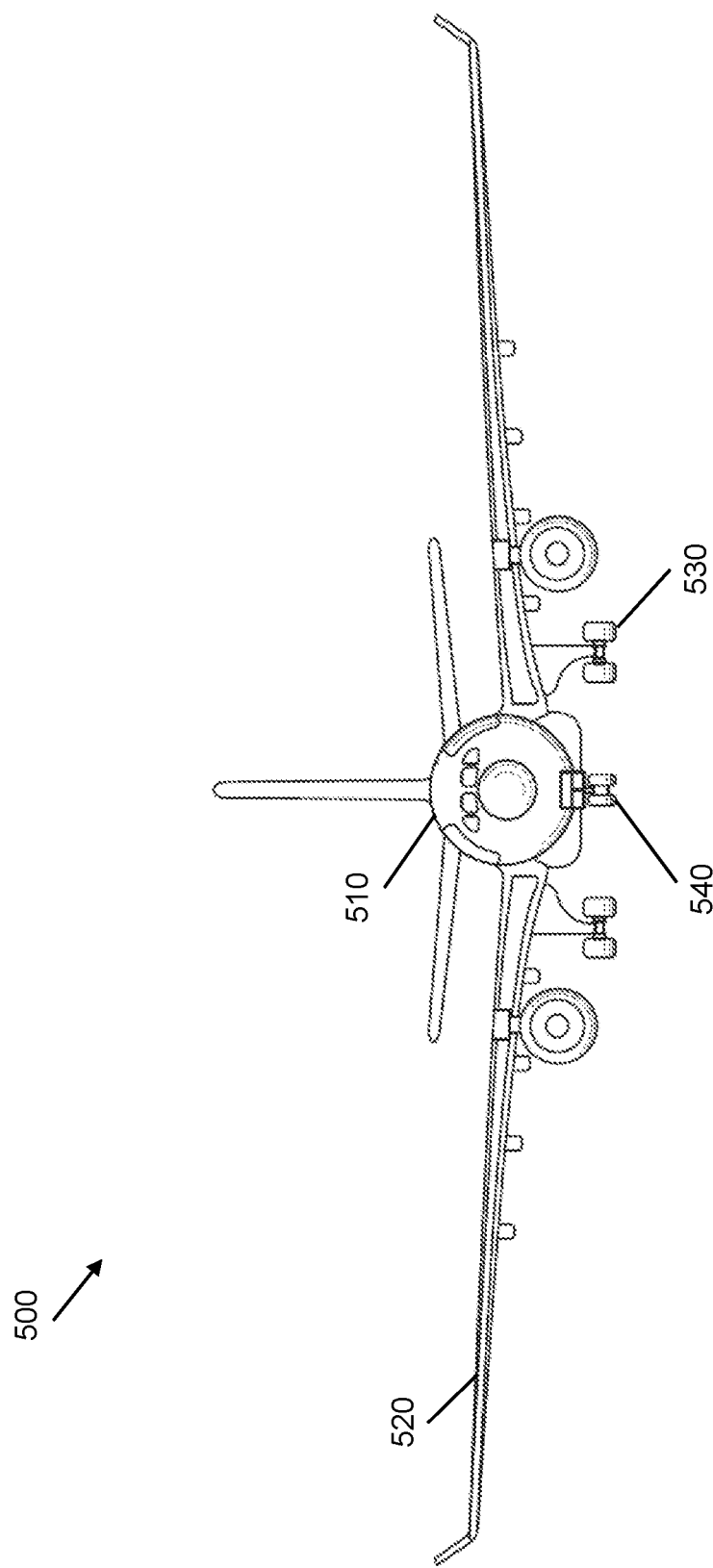
FIG. 5 shows a schematic representation of a tyre pressure sensor network installed in an aircraft.

FIG. 5 shows a schematic representation of a tyre pressure sensor network installed in an aircraft. The aircraft 500 comprises a fuselage 510, wings 520, main landing gear 530 and nose landing gear 540. According to an example, the aircraft 500 comprises a sensor network according to any of the examples described herein. The aircraft 500 may be used in conjunction with any of the methods described herein. According to an example, a plurality of wireless nodes are distributed at various locations around the aircraft 500. For example, in the landing gear 530, 540, the wings 520, and in the fuselage 510. Tyre monitoring devices are installed on each wheel of the main landing gear 530 and nose landing gear 540.

In an example, the tyre monitoring devices 10 are also in communication with a cockpit system to provide tyre pressure information to the pilots on the flight deck. In these examples, the flight deck console may also function as a control device.

Example Tyre Pressure Check Processes

Figure 6:
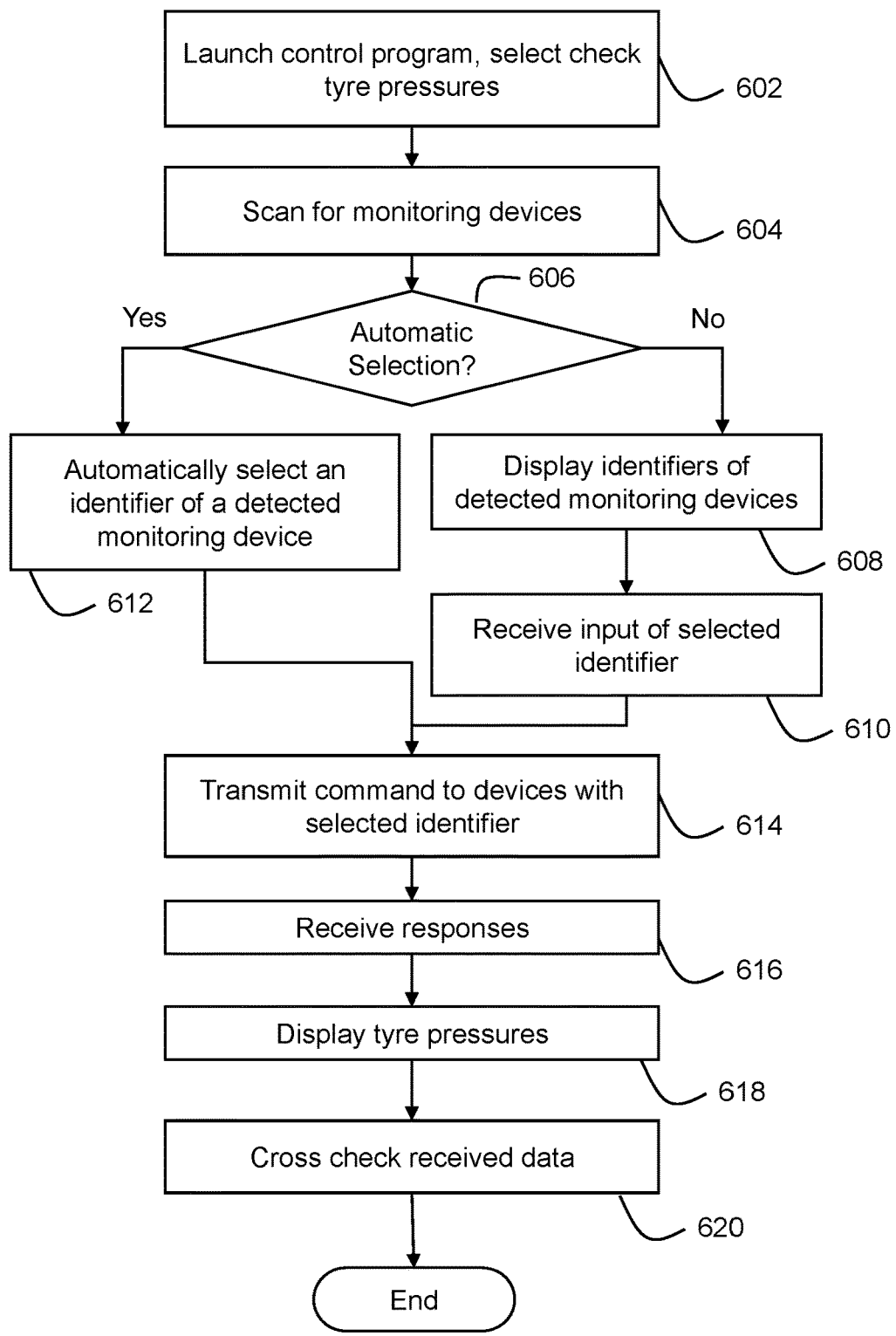
FIG. 6 shows a flow chart of a tyre pressure check process that can be used with the example of FIG. 1.

FIG. 6 shows a flow chart of a tyre pressure check process that can be used with the example of FIG. 1. First, at block 602, a user launches the tyre monitoring control application on the control device 12. During initialization of the application, a check is made that the wireless communication interface 308 for communication with the monitoring devices is active on the control device and the user is prompted to activate if it is not active.

Next, at block 604, the control device scans for tyre monitoring devices in range. For example, the control device may send out a probe over the wireless communication interface which causes any tyre monitoring devices in range to respond with an indication of their vehicle identifier, such as tail identifier of an aircraft to which the tyre monitoring device is attached. The scanning may comprise establishing direct, point-to-point contact with each tyre monitoring device, or contact through the network of tyre monitoring devices, for example through an access point, a master device, or any device in a mesh network. The scanning may comprise waking the tyre monitoring devices from a low power mode. The scanning may comprise using a secure network key to communicate with the sensor network.

Depending on the communication range and location, tyre monitoring devices associated with more than one vehicle may be detected. For example, several aircraft may be in the same hanger in range of the control device. Next, at block 606, it is determined whether an identifier should be selected automatically, without requiring using input. For example, the application may store a configuration option whether an identifier should be selected automatically or not. If automatic selection is not required, the process continues to block 608. If automatic selection is required, the process continues to block 612. In some examples, block 606 is not included. In these examples, the process can continue with either manual selection or automatic selection as explained below.

For manual selection, at block 608, the control device displays the identifiers of detected vehicles. At block 610, input is received of a selected identifier, for example from a user selection of the desired identifier.

For automatic selection, at block 612 a vehicle identifier is automatically selected from amongst the identifiers indicated in the received responses. The can be done in various ways. For example, when each tyre monitoring device in range responds individually to the control device, at least two responses may be from tyre monitoring devices associated with the same vehicle identifier. In that case, the vehicle identifier associated with the largest number of responses may selected automatically because that is likely to be the vehicle closest to the control device for which pressure measurement is required. In another example, the vehicle identifier of the tyre monitoring device closest to the control device may be selected, for example a response having a greatest Received Signal Strength Indication (RSSI). In a further example, all detected tyre monitoring devices may be associated with the same vehicle identifier, in which case that is selected.

Next, at block 614, a command is sent to the tyre monitoring devices corresponding to the selected identifier to cause them to read the pressures and report back to the control device, for example they may execute a process as described below with reference to FIG. 7.

Responses are received from the tyre monitoring devices at block 616 and displayed on the control device at block 618. The display of pressures may include one or both of a numerical value and a status indication such as "OK" or "Low Pressure".

At block 620 a cross check of the received data may be made to ensure data consistency. The process then ends.

Throughout the process of FIG. 6, communication between the control device and the sensor devices may be secure, for example encrypted by a network key. The network key for the communication with the control device may be different from the network key used for communication between the sensor devices to enhance the security of the system.

Security may be increased by using a wireless communication technology with a limited transmission distance when exchanging secure keys, for example 802.11 (Wi-Fi) standards may allow transmission over a distance of 50 m or further in clear space. In some examples, security may be increased by reducing transmission power, or using a low distance technology such as NFC or RFID, when encryption keys are transmitted compared to transmission of the encrypted data itself, requiring closer proximity for the initial key exchange process. Distance bounding techniques could also be introduced which, when combined with ultra-wide band radio communication, the distance of the communicating equipment can be securely measured, ensuring that the interaction is happening within a secure perimeter of the equipment, this is discussed further with reference to FIG. 8 below.

Figure 7:
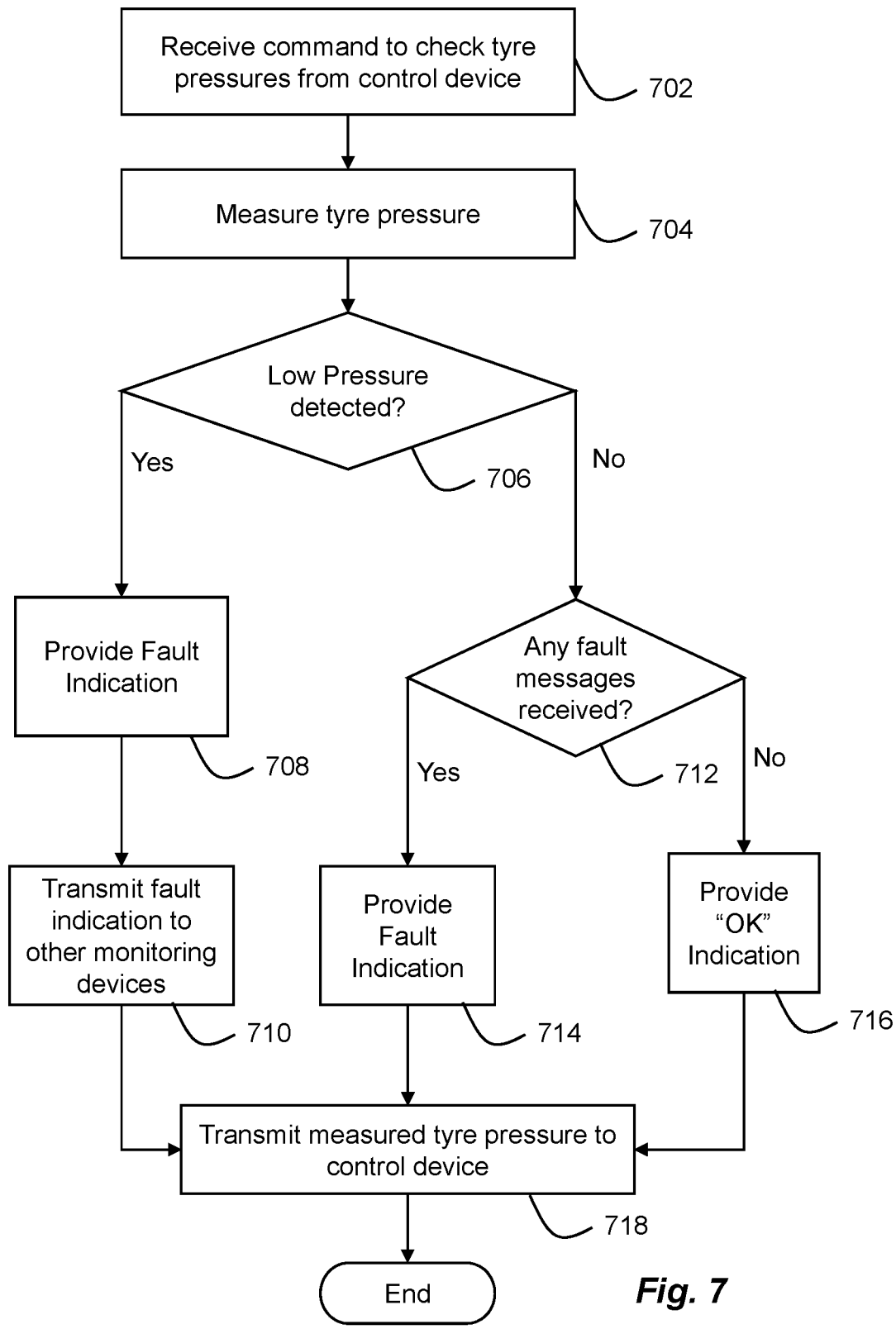
FIG. 7 shows a flow chart of a tyre pressure check process that can be used by the tyre monitoring device of FIG. 2.

FIG. 7 shows a flow chart of tyre pressure check process that can be used by the tyre monitoring device of FIG. 2. This process is provided to provide additional assurance and fault tolerance in the pressure measurements from the system, for example to guard against corrupt operation or errors in the control device. Through this process, the monitoring device uses its indicator to provide an indication of tyre pressure status independent of the control device. In some examples, the indication of tyre pressure status by the monitoring device may have a higher Development Assurance Level (DAL) than the indication provided on the control device. For example, although the control device may be used to initiate a tyre pressure measurement and provide a convenient means for a user to understand the results of the measurement it may not have DAL certification, while the operation of the monitoring device to provide the indication using the indicator on the monitoring device may be certified to Development Assurance Level B. This may allow the system to operate with a wide range of control devices, because certification of those devices to a DAL is not required, but still ensure that the system as a whole meets required safety standards. Similarly, in some examples the monitoring device may have a higher Security Assurance Level (SAL) than the control device.

First, at block 702, a tyre monitoring device receives a command to check pressures over the wireless communication interface from the control device. In response, at block 704, the processor uses the pressure sensor to measure the pressure in the tyre. The measured pressure is then compared against the reference pressure in block 706 to determine whether the tyre has low pressure. In this example low pressure occurs if the pressure sensed by the pressure sensor is less than 89% of the reference pressure. Other examples may determine a low pressure when the measured pressure is less than 95%, less than 90% or less than 85% of the reference pressure. Further examples may determine a low pressure when the measured pressure is at least about 207 kPa (about 30 psi) less than the reference pressure. Other examples may determine a low pressure when the measured pressure is at least about 138 kPa (about 20 psi), or about 69 kPa (about 10 psi) less than the reference pressure. If low pressure is detected, execution proceeds to block 708, otherwise execution proceeds to block 712.

At block 708, the processor uses the indicator to indicate a fault condition, for example by providing a solid red light for a predetermined period. The predetermined period may be 5 minutes, 2 minutes, 1 minute, or 30 seconds, for example. The processor also broadcasts a fault indication to the other tyre monitoring devices at block 712, again using the wireless communication interface.

At block 712, the processor checks to see whether any fault messages from other tyre monitoring devices have been received via the wireless communication interface. Such fault messages may be received directly, via other tyre monitoring devices or through a hub or access point. In this example, such fault messages are received without first being requested, following the receipt of the command in block 704. In other examples, the fault message may be received responsive to a status enquiry sent by the tyre monitoring device to the other tyre monitoring devices. If any fault messages are received, execution proceeds to block 714, where the processor uses the indicator to display a fault condition. For example, the fault indication may be the same as that used in block 708. In other examples, the fault indication may be different than that used in block 708, for example a second fault indication such as a flashing red light for a predetermined period. By using the second fault indication, the tyre monitoring device can indicate a fault in another tyre yet signal that its own measured pressure is not low.

If no fault messages are received at block 712, execution proceeds to block 716 where the processor uses the indicator to provide an "OK" indication. For example, by providing a solid green light for a predetermined period. The predetermined period may be 5 minutes, 2 minutes, 1 minute, or 30 seconds, for example. In this way, the "OK" indication is only given when all tyre monitoring devices have determined that the pressure of their associated tyre is not low and that they have not received an indication of a fault from another of the tyre monitoring devices.

Finally, at block 718, the data of the measured tyre pressure is transmitted to the control device in response to the command. This data may include further information such as stored reference pressure, determined status, and wheel position. Transmission of additional information may allow verification of the correct operation of the tyre monitoring device and a check that the configuration data stored in the storage has not changed or has been set up correctly. The transmission in block 718 may be sent directly to a control device 12, to another tyre monitoring device 10 for onward routing, or to an access point or other wireless node.

With the method of FIG. 7, confirmation of tyre pressure status is provided by the tyre monitoring devices themselves. A fault in any sensor causes all sensors to indicate a fault. In this way, the tyre monitoring devices may be certified according to a required DAL and/or SAL using the indication on the tyre monitoring devices themselves without requiring the control device to also be certified.

In other examples, rather than transmitting a fault indication at block 710, all tyre monitoring devices may instead transmit their measured pressure to other tyre monitoring devices. Received pressures may then be independently checked by each independent tyre monitoring device to determine whether faults exist. This may guard against a fault in a sensor which does not indicate a low pressure condition, for example if the stored reference pressure has become corrupted.

In further examples, the tyre monitoring device may transmit an "OK" status notification when it is determined that the tyre pressure is not low in block 706. Such examples may provide assurance that all sensors are operating correctly, because if no data is received from one of the other tyre monitoring devices it is indicative of a malfunction or fault in that tyre monitoring device.

Although the processes above describe the use of a general mobile device as a control device, the control device may also be a dedicated device provided only for use with the tyre monitoring system, or with the vehicle more generally. This may improve security as greater control is available.

Although the processes above describe the use of an indicator which is a light, other examples may use other indicators, such as displays and/or audio components. For example, rather than simply display a solid or flashing colour, a display may also display information of the measured pressure itself. Where audio and visual indicators are both provided, some indications may not use both the audio and visual indicator. For example, an "OK" indication may use only the visual indicator, with the audio indicator only activated on a fault.

Distance Limitations for Increased Security

The use of wireless communication can bring an increased security risk because the wireless channel is more easily accessible to third parties. Encryption of messages exchanged between devices in the tyre monitoring system makes it harder to malicious devices to eavesdrop or inject malicious commands or data without knowledge of the encryption key. As mentioned above, limiting the distance of communication can also improve security. Such a limitation in distance may be inherent in the wireless communication protocol, for example NFC and RFID typically operate over ranges of less than 30 cm. Other wireless communication protocols, such as WiFi or 802.11 protocols might have a range of around 50 m in clear space or lower if the transmission power is limited. Nevertheless, even when transmission power limits communication range, it does not provide a clearly defined boundary. Range can be extended by using a directional antenna to increase sensitivity, for example.

In this embodiment a distance criterion is used at a tyre monitoring device. When communication takes place, the range or distance to the device in communication is determined and assessed against the distance criterion. If the range is greater than a threshold distance then communication is ceased, and any commands or data received are not processed. Alternatively, commands or data received may only be processed if the range is lower than the threshold distance. For general use with a tire monitoring system, a suitable threshold distance is 40 m, 30 m or 25 m. Security against malicious attacks is improved because physical proximity is enforced.

A lower threshold distance may be used for particular types of command, such as configuration commands and/or exchange of encryption keys. In this case, the distance threshold may be 1 m, 50 cm, 25 cm or 5 cm, for example.

Any suitable technology can be used to determine the range. The wireless communication protocol itself can include range-finding technology. For example, Ultra-Wideband (UWB) communication includes range determination as part of the protocol stack. Range or distance is preferably determined actively, for example by using time of flight measurement, along with exchange of range data between transmitting and receiving devices, such as defined in IEEE 802.15.4a or IEEE 802.15.4z.

An example method to use an enforced distance limitation to improve the security of a tyre pressure check process, such as that as described with reference to FIG. 7, will now be explained. This method can be used to decide whether to a execute or action a command received over a wireless interface at block 702, or whether data received from other sensors, such as fault messages at block 712, should be processed or rejected.

Figure 8:
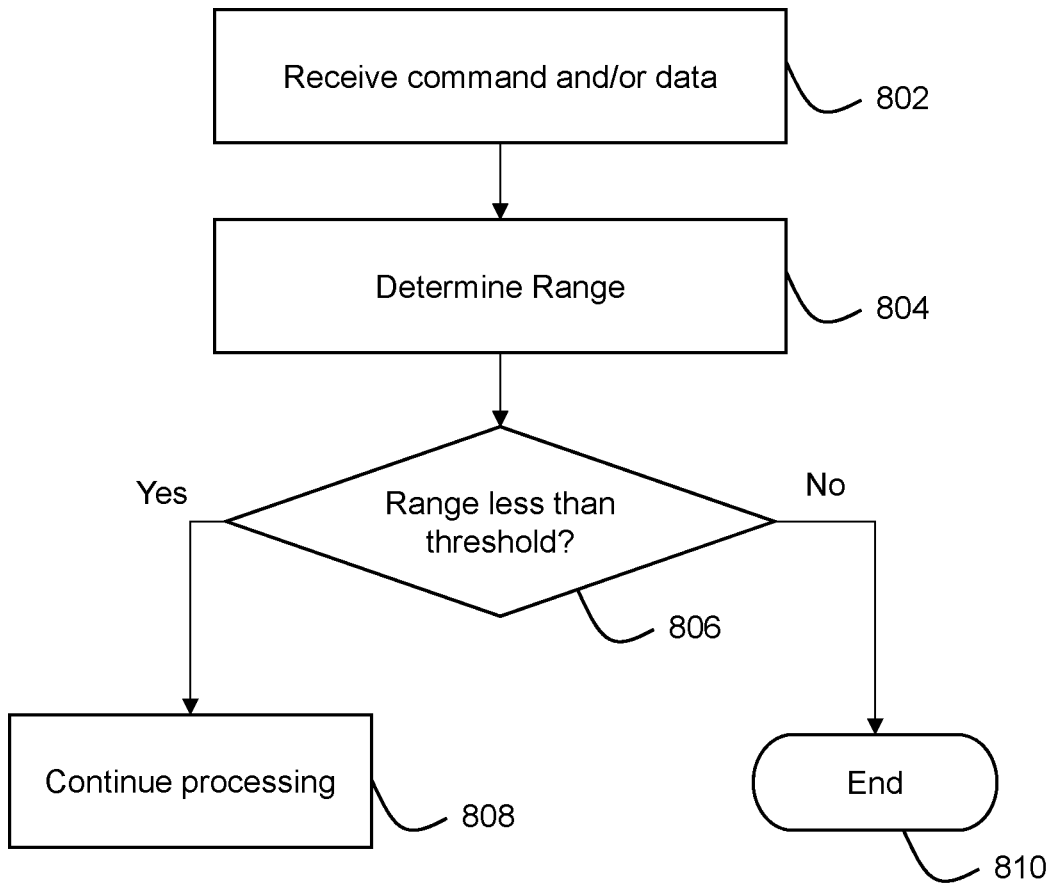
FIG. 8 shows a flow chart of a process for enforcing a communication range on received commands or data.

FIG. 8 depicts an example method which can be used to enforce a distance limitation. First, at block 802, a tyre monitoring device receives a command and/or data via a wireless interface from another device of the tyre monitoring system. This may be from another tyre monitoring device (such as for received data) or a control device (such as for commands) In this example, the data is received over a UWB wireless interface.

Next at block 804, a range to the second device is determined. Any suitable range-finding technology can be used. For example, time-of-flight methods in which the devices exchange range finding data, calculate a time of flight and compute a range provides accurate range measurements which are difficult to spoof.

Once the range is determined, it is determined whether range is under a predetermined distance threshold at block 806. If the range is under the threshold, execution proceeds to block 808 where the command is actioned or the data is processed, as appropriate. If the range is above the threshold, then the method ends at block 810. In some examples, an alert can be provided such as by flashing the indicator or the tyre monitoring device to show that potentially malicious commands or data have been received before the method ends at 810.

The above examples are to be understood as illustrative examples of the invention. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tire monitoring device configured to be mounted on an aircraft wheel and for use in a tire monitoring system, the tire monitoring device comprising:
   a wireless interface having distance determining capability; and
   a processor configured to:
      receive a command via the wireless interface from a wireless transmission from a second device of the tire monitoring system;
      in response to receiving the command, determine a distance to the second device, wherein the distance to the second device is the length between the second device and the wireless interface; and
      execute the command if the distance to the second device is less than a predetermined threshold.

2. A tire monitoring device configured to be mounted on an aircraft wheel for use in a tire monitoring system, the tire monitoring device comprising:
   a wireless interface having distance determining capability; and
   a processor configured to:
      receive data via the wireless interface from a wireless transmission from a second device of the tire monitoring system;
      in response to receiving the data, determine a distance to the second device, wherein the distance to the second device is the length between the second device and the wireless interface; and
      reject the data if the distance to the second device is greater than a predetermined threshold.

3. The tire monitoring device according to claim 2, wherein the processor is configured to:
   receive a command via the wireless interface from a third device of the tire monitoring system;
   determine a distance to the third device, wherein the distance to the third device is the length between the third device and the wireless interface; and
   act on the command if the distance to the third device is less than a predetermined threshold.

4. The tire monitoring device according to claim 1, wherein the wireless interface comprises an ultra-wideband interface.

5. The tire monitoring device according to claim 1, wherein the predetermined threshold is less than or equal to 40 m.

6. A tire monitoring system comprising a plurality of tire monitoring devices according to claim 1.

7. The tire monitoring system according to claim 6, further comprising a control device comprising a wireless communication interface having a distance determining capability.

8. A method for a wireless tire monitoring device mounted on an aircraft wheel and including a wireless interface, the method comprising:
   receiving wirelessly a command via the wireless interface from a second device;
   in response to the receiving the command, the tire monitoring device determining a distance to the second device, wherein the distance to the second device is the length between the second device and the wireless tire monitoring device; and
   the tire monitoring device acting on the command if the distance to the second device is less than a predetermined threshold.

9. A method for a wireless tire monitoring device mounted on an aircraft wheel and including a wireless interface, the method comprising:
   receiving wirelessly data via the wireless interface from a second device;
   in response to the receiving of the data, the tire monitoring device determining a distance to the second device, wherein the distance to the second device is the length between the second device and the wireless interface; and
   rejecting the data, by the tire monitoring device, if the distance to the second device is greater than a predetermined threshold.

10. The method according to claim 9, further comprising:
    receiving a command via the wireless interface from a third device of the tire monitoring system;
    in response to the receiving of the command, the tire monitoring device determining a distance to the third device, wherein the distance to the third device is the length between the third device and the wireless interface; and
    acting on the command, by the tire monitoring device mounted, if the distance to the third device is less than a predetermined threshold.

11. The method according to claim 8, wherein the wireless interface comprises an ultra-wideband interface.

12. The method according to claim 8, wherein the predetermined threshold is less than or equal to 40 m.

13. The tire monitoring device of claim 1, wherein the processor is configured to make the determination of the distance using a time of flight of a wireless signal exchanged between the tire monitoring device and the second device.

14. The tire monitoring device of claim 2, wherein the processor is configured to make the determination of the distance using a time of flight of a wireless signal exchanged between the tire monitoring device and the second device.

15. The method of claim 8, wherein the determining of the distance is made using a time of flight of a wireless signal exchanged between the tire monitoring device and the second device.

16. The method of claim 9, wherein the determining of the distance is made using a time of flight of a wireless signal exchanged between the tire monitoring device and the second device.

17. The tire monitoring device of claim 1, wherein the second device is external to an aircraft on which is mounted the aircraft wheel.

18. The tire monitoring device of claim 2, wherein the second device is external to an aircraft on which is mounted the aircraft wheel.

19. The method of claim 8, wherein the second device is external to an aircraft on which is mounted the aircraft wheel.

20. The method of claim 9, wherein the second device is external to an aircraft on which is mounted the aircraft wheel.

* * * * *